May 31, 1949. W. P. NORTON, JR 2,471,493
CAM FINISHING MACHINE
Filed Feb. 18, 1948 2 Sheets-Sheet 1
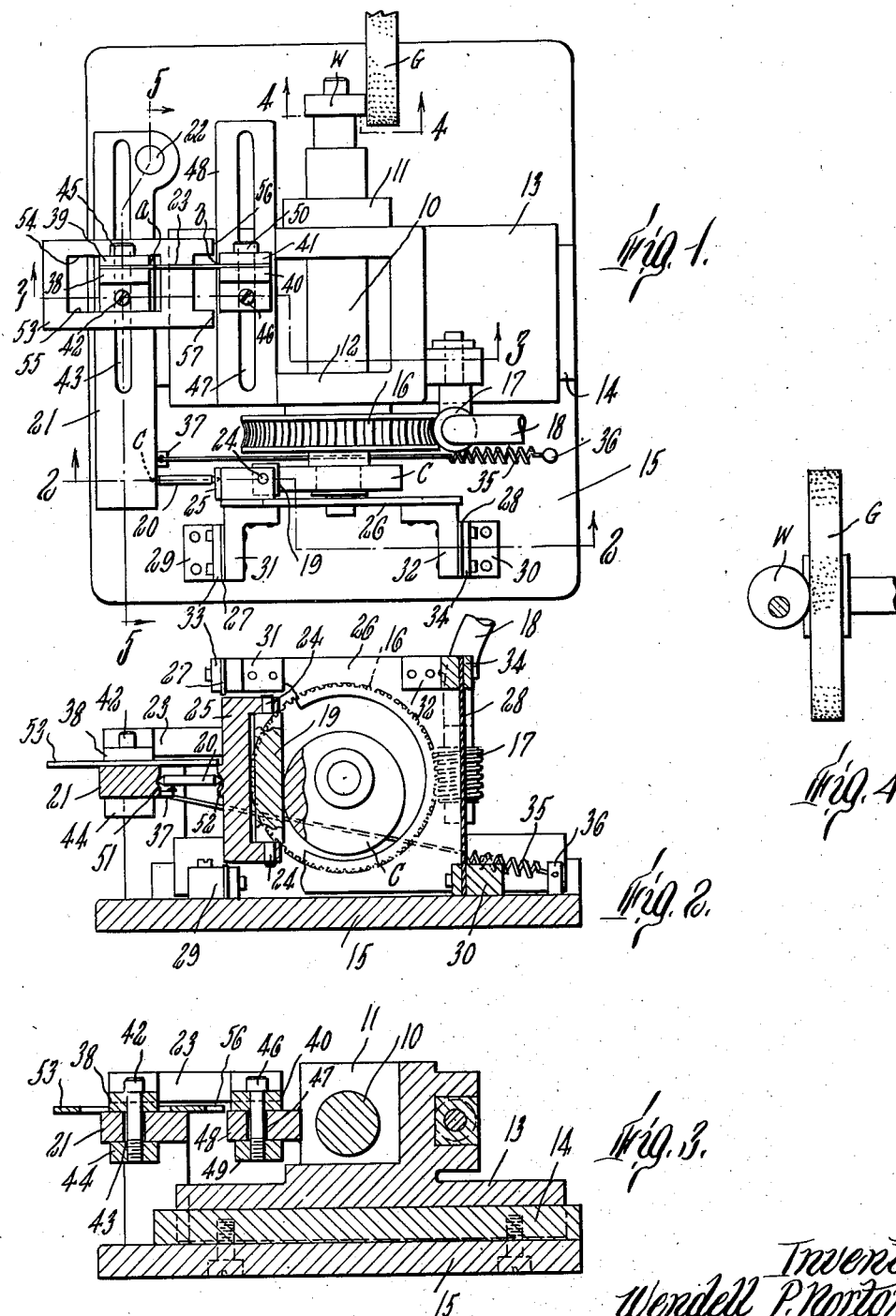
Inventor
Wendell P. Norton, Jr.

May 31, 1949. W. P. NORTON, JR 2,471,493
CAM FINISHING MACHINE
Filed Feb. 18, 1948 2 Sheets-Sheet 2
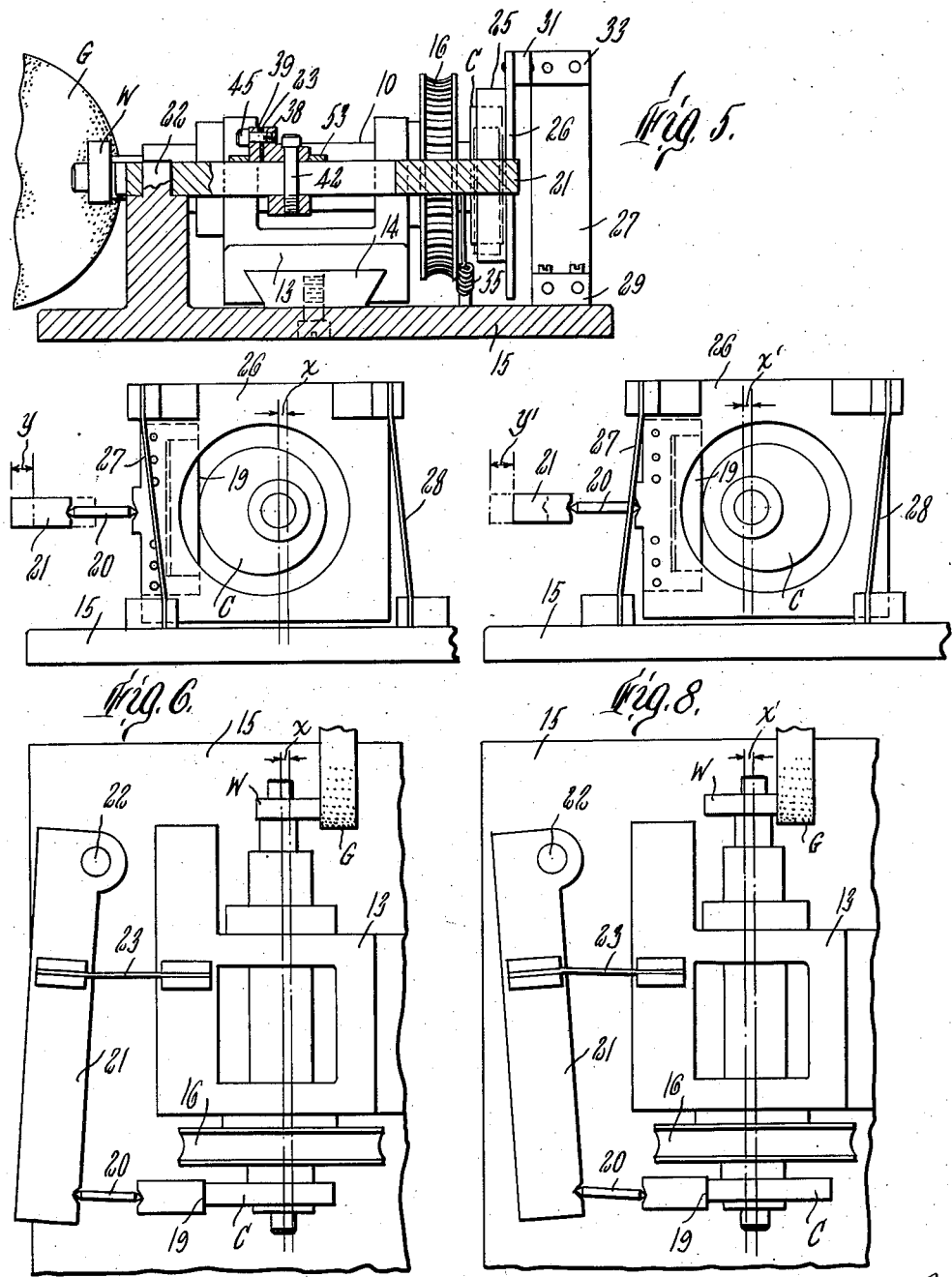
Inventor
Wendell P. Norton Jr.

Patented May 31, 1949

2,471,493

UNITED STATES PATENT OFFICE 2,471,493

CAM FINISHING MACHINE

Wendell P. Norton, Jr., Springfield, Vt., assignor to The Fellows Gear Shaper Company, Springfield, Vt., a corporation of Vermont Application February 18, 1948, Serial No. 9,142

9 Claims. (Cl. 51—127)

The object of this invention is to provide a simple and accurate machine or mechanism by which cams may be cut and finished peripherally with angular similarity to a master cam and in various dimensions equal to, or larger or smaller than, the master cam. Important features of the invention, which conduce to the accomplishment of the foregoing object, are that the work piece and master cam are connected for simultaneous movement and are preferably mounted coaxially on the same spindle, shaft or holder, and that such holder and cam are in turn mounted on a carriage which is shifted by the cam by means of an adjustable linkage in the nature of a pantograph to effect displacement of the work piece with relation to the cutting tool through distances which may be greater or less than, or equal to, the throw of the cam.

A machine which contains and illustrates the principles of the invention in one of the practical embodiments thereof is described in the following specification with reference to the accompanying drawings, in which, Fig. 1 is a plan view of such machine;

Figs. 2 and 3 are cross sections of the machine taken on lines 2—2 and 3—3, respectively, of Fig. 1;

Fig. 4 is a fragmentary view showing the work piece and a grinding wheel by which its periphery is cut and finished, as viewed from the line 4—4 of Fig. 1 in the direction of the arrows applied to that line;

Fig. 5 is a longitudinal section of the machine taken on line 5—5 of Fig. 1;

Figs. 6 and 7 are, respectively, an end view and a plan view of the machine showing the relation of the parts when the carriage is displaced in one direction to the maximum extent of the throw of the master cam;

Figs. 8 and 9 are views similar to Figs. 6 and 7, respectively, showing the position of the parts when the carriage is displaced in the opposite direction to the maximum extent permitted by the master cam.

Like reference characters designate the same parts wherever they occur in all the figures.

In the embodiment of the invention here illustrated the cutting tool is a grinding wheel G which is mounted on any suitable support and is rotated by any suitable means, with provisions for whatever adjustments may be needed to place it in operating position and compensate for removal of its substance when dressed or trued. Such supporting and driving means are not features of the present invention, and any standard equipment may be used for that purpose. Neither is it essential that the cutting tool be a grinding wheel, and the one here shown may be taken as typical of any suitable cutting tool.

The work piece W is secured detachably to one end of a work spindle or shaft 10 which is mounted rotatably in bearings 11 and 12 on a slide or carriage 13 which is movable rectilinearly on a guide 14 (Figs. 3 and 5) secured to a base 15. This base and guide are arranged with respect to the grinding wheel G so that the perimeter of the work piece may be brought to bear on a flat surface of the grinding wheel perpendicular to the axis of rotation thereof, and the carriage is movable in a path transverse to that surface. As here shown, the guide is perpendicular to the plane of the grinding wheel surface and the axis of the work spindle 10 is perpendicular to the guide and parallel to the surface of the grinding wheel.

As shown, the work spindle protrudes at both ends from its bearings on the carriage and the work piece is secured to one end. The opposite end of the spindle carries a master cam C. Rotation is imparted to the work spindle by suitable driving means of which one illustrative form is shown here consisting of a worm wheel 16 secured to the spindle and a worm 17 meshing with the worm wheel and driven by a flexible shaft 18 to which rotation is imparted by an electric motor or other source of power located in any convenient position with respect to the carriage, which permits the necessary movements of the carriage.

Linear movement is imparted to the carriage 13 by cam C through a linkage which includes an abutment block 19 on which the cam bears at its perimeter, a push rod or pin 20, a lever 21 pivoted on a fixed stud 22 which rises from the base 15, and a coupling member 23 between the lever and carriage, which is located at an intermediate position between the push rod 20 and the pivot stud 22, and is adjustable in directions which extend transversely of the carriage and lengthwise of the lever. Further particulars of the members constituting this linkage are hereinafter described.

The abutment block 19 has a plane contact face and is mounted by trunnions 24 at its ends in a chair 25 which holds it with its contact face parallel to the active surface of the grinding wheel. Chair 25 in turn is secured rigidly to a plate 26 which is supported from the base by parallel stiff resilient bars 27 and 28. These bars are attached to the base 15 by clamps 29 and 30, respectively, and their opposite ends are connected to brackets 31 and 32, respectively, by clamps 33 and 34; and said brackets are secured to the plate 26. The spring bars 27 and 28 are of equal length between the points where they leave the clamps 29 and 30 and the points at which they enter between the brackets and clamps 31, 33 and 32, 34, respectively; and the distance between the clamps 29 and 30 is equal to the distance apart of the clamps 33 and 34 in the assemblage. Thus the spring bars form two opposite sides of a parallelogram, supporting the abutment block 19, permitting the latter to be displaced by the cam and causing all positions of its contact face, when displaced, to be parallel to one another and to the active surface of the grinding wheel.

A spring 35 is anchored to the base 15 by a stud 36 and is connected to a lug 37 on lever 21 near the thrust rod 20. It is so connected under tension whereby it exerts constant force through the thrust pin 20 and chair 25 to hold the abutment block against the cam face. It is sufficiently powerful to flex the parallel spring bars when receding portions of the cam face permit the abutment block to pass the neutral position where the spring bars are unstressed.

The coupling 23 between carriage 13 and lever 21 is, in this embodiment, a flat metal reed having resilient flexibility and being at the same time stiff enough to transmit, without buckling, thrusting force on the carriage 13 sufficient to displace the carriage when the lever is caused to swing toward the carriage. This reed is connected at one end to the lever 21 by means of a clamp bracket 38 and cooperating clamp block 39, and to the carriage by means of a similar clamp bracket 40 and cooperating block 41. The clamp bracket 38 is secured to the lever 21 by a bolt 42 passing through an elongated slot 43 in the lever and a nut 44 (Fig. 3) on the bolt beneath the lever. Block 39 is secured to bracket 38 by a bolt 45. Clamp bracket 40 is similarly secured to the carriage by a bolt 46 passing through an elongated slot 47 in a beam or ledge 48, which forms a structural part of the carriage, and a nut 49 on the bolt. Block 41 is secured to bracket 40 by a bolt 50.

The beam or ledge 48 is situated in a plane parallel to the path in which the carriage is adapted to move, and is disposed so that the slot 48 is perpendicular to the directions of that path. Lever 21 is arranged to swing in the same plane, or a nearly adjacent parallel plane, and to occupy a position where its slot 43 is parallel to slot 47. Preferably this position is occupied by the lever when the carriage 13 is midway, or approximately so, of the range of its movement effected, or controlled, by the master cam C. Hence the lever swings to opposite sides of the parallel position, previously referred to, in moving the carriage back and forth during one cycle of the cam.

The effective lengths of the push rod 20 and coupling 23 are equal, and these members are parallel when the lever is in the before mentioned parallel position. Push rod 20 is conically pointed at both ends which enter conical recesses 51 and 52 in the adjacent faces of lever 21 and chair 25, respectively, to make point contact with the bottoms of those recesses.

The effective length of coupling reed 23 is its length between the point $a$ where it enters between the clamping members 38 and 39, and the point $b$ where it enters between clamp members 40 and 41; and the axis of pivot 22, the point $a$, and the point $c$ where the push rod bears on lever 21 are all in the same straight line. Thus the linkage between the master cam and the carriage forms a parallelogram, of which the sides constituted by the rod 20 and coupling 23 are of invariable length and the other two sides are variable by adjustment of the clamp brackets 38 and 40 along the slots 43 and 47.

These slots extend in one direction beyond the axis of pivot 22 so that the coupling 23 can be placed in intersection with that axis, in which case no movement is imparted to the carriage when the cam rotates. In the opposite direction the slots extend far enough from the pivot axis to permit placement of the coupling in a position for imparting movement to the carriage greater than the throw of the cam.

To facilitate adjustment of the coupling 23 and maintain its parallel relationship without need of taking measurements, a gauge plate 53 is mounted on the lever 21. This plate has an opening bounded by parallel sides 54 and 55 which embrace with a sliding fit the base of clamp bracket 38 and clamp block 39. It extends toward the carriage 13 and at its end adjacent thereto is provided with jaws 55 and 56 spaced apart enough to embrace closely the base of clamp bracket 40 and clamp block 41. When the lever is placed with its slot 43 parallel to slot 47, the gauge plate can be moved back to embrace the clamp 40—41 and then, after loosening the bolts 42 and 46, can be moved lengthwise of the slots to adjust both reed clamps simultaneously. It is retracted clear of the clamp 40—41 when adjustments have been made and the machine is in operation, the opening in the plate which receives the clamp 38—39 being long enough for that purpose.

In the operation of this machine, the master cam causes displacement of carriage 13 by a distance which is greater or less than the differences between its radii at different points, in accordance with the setting of the coupling 23. As the cam rotates, it causes displacement of the abutment block 19 which, in turn, causes or enables the lever 21 to be swung about its pivot and the carriage 13 to be displaced by the pull or thrust of the coupling 23. The carriage moves the work piece W away from or toward the grinding wheel, according to the direction of its movement, and it equally displaces the cam in the same direction. Thus the displacement of the abutment is the sum of the cam throw and the displacement of the carriage. The carriage displacement may vary from zero, when the point $a$ of the coupling is located over the pivot axis, to a maximum, greater than the cam throw, when the coupling is located as far from the pivot 22 as the slots 43 and 47 permit.

Figs. 6 and 7 show, by comparison with Figs. 1 and 2, the nature of these displacements when the carriage is shifted from approximately mid position by the part of the cam having the longest radius. Here the abutment and carriage are shifted to the left the carriage being displaced by the distance designated $x$ in Figs. 6 and 7, and the abutment by the distance designated $y$, which is the sum of the displacement $x$ and the cam throw. Figs. 8 and 9 shows a similar comparison when the carriage is permitted by the receding surface of the cam to be moved to the right by spring 35; and here $x'$ designates the displacement of the carriage and $y'$ the displacement of the abutment.

Displacements of the work piece are, of course, equal to those of the carriage and occur as and when projecting or receding portions of the cam cause the carriage to be shifted in one direction or enable the spring 36 to shift it in the opposite direction. Thus the angular characteristics of the work are made similar to those of the master cam and the length of its radii at different points made shorter or longer than those of corresponding points on the cam, or of equal length, according to the adjustment of the coupling 23. In the zero adjustment, the work piece is given the outline of a circle. Settings of the coupling to obtain any prescribed extent of displacement of the carriage may be made according to the following formula:

$$X = \frac{AD}{D+T}$$

where

X is the distance of the coupling from the pivot axis of lever 21;
A is the distance of the engaging point with pin 29 from the axis;
D is the prescribed displacement of the carriage; and
T is the throw of the master cam.

Modifications in and variations from the particulars herein shown and described may be made within the scope of the invention, for the embodiment here shown is illustrative of the principles involved and is not limiting as to the structures in which those principles may be embodied. Thus, for instance, a link pivotally connected at opposite ends to anchor members adjustable on the lever 21 and carriage 13 may be substituted for the reed 23 and other means than the thrust rod 29 and spring 36 may be used for moving the lever 21 in accordance with the throw and displacement of the master cam. However, in all such variations, the linkage for imparting displacement to the carriage must be in effect a pantograph pivoted at a fixed point on the base.

Correspondingly links, or other equivalent connectors between the base 15 and the abutment carrier plate 26, may be substituted for the spring bars or reeds 27 and 28; provided that such connectors maintain the parallel relationship of all positions of the abutment contact face.

The master cam is here represented for simplicity as a circular disk eccentrically mounted. In many cases, however, a master cam of other than circular outline will be used, provided only that, when used with a tool of which the cutting portion lies in a plane and with an abutment block of which the contact face is correspondingly straight, the cam cannot be concave in any part of its outline. But the invention includes also embodiments for cutting cams with outlines concave in part, using a master cam concave in part and a cam abutment or follower with convexity capable of entering the concavity of the master cam, instead of the straight abutment shown, and disposing the cutting tool so as to act at its circumference. In any such case, the diameter of the cutting tool and the radius of the cam abutment or follower must bear a relation determined by the particular size relation between the master cam and the work desired at the moment. This relation can be determined according to the generally understood principles of this type of cutting operation.

The mounting of the master cam and work piece on the same spindle or holder has the great practical advantage of exactly equalizing the angular movement of the work with that of the cam in the simplest and easiest possible way.

What I claim is:

1. A cam cutting machine comprising a supporting structure, a carriage mounted on said supporting structure with provision for linear movement in opposite directions, a work holder supported rotatably on said carriage with its axis of rotation transverse to the path of the carriage, a master cam secured to the work holder, a cutting tool operatively mounted in relation to the carriage such that the carriage moving in its prescribed path displaces a work piece secured to the work holder, toward or away from the cutting tool, and a pantograph linkage pivoted at a fixed point on the supporting structure arranged to be moved about its pivot by said master cam and including an adjustable connection with the carriage.

2. A cam cutting machine comprising a supporting structure, a carriage mounted on said supporting structure with provision for linear movement in opposite directions, a work holder supported rotatably on said carriage with its axis of rotation transverse to the path of the carriage, a master cam secured to the work holder, a cutting tool operatively mounted in relation to the carriage such that the carriage moving in its prescribed path displaces a work piece, secured to the work holder, toward or away from the cutting tool, a lever pivoted to the supporting structure in relation to said master cam to be turned about its pivot in consequence of rotation of the master cam, and a coupling between said lever and the carriage arranged to cause linear displacement of the carriage when the lever is so turned.

3. A cam cutting machine comprising a supporting structure, a carriage mounted on said supporting structure with provision for linear movement in opposite directions, a work holder supported rotatably on said carriage with its axis of rotation transverse to the path of the carriage, a master cam secured to the work holder, a cutting tool operatively mounted in relation to the carriage such that the carriage moving in its prescribed path, displaces a work piece, secured to the work holder, toward or away from the cutting tool, a lever pivoted on the supporting structure having a long arm operatively related to said master cam to be shifted in consequence of rotation of the cam and a shorter arm of variable effective length in motion-transmitting connection with the carriage.

4. A machine for cutting cams with any one of a number of ratios of throw to the throw of a master cam and with equal angular distribution of corresponding portions, which comprises a base, a carriage movable back and forth in a definite path on said base, a rotatable work holder mounted on the carriage adapted for carrying a work piece, a master cam secured to said work holder, the axis of rotation of the work holder and the work piece and cam thereon being transverse to the path of movement of the carriage, means for rotating the work holder, a lever pivoted on the base having an operating arm, a cam follower arranged to bear on the cam and in motion-transmitting engagement with the lever at a point distant from the axis of the lever, and a coupling connected with the carriage and lever in a location between the lever pivot and the line of thrust between the cam follower and lever, said coupling being adjustable toward and away from the pivot of the lever to cause variation in the extent of movement imparted through the coupling to the carriage with a given angular displacement of the lever.

5. A machine for cutting cams in proportional similarity to a master cam, comprising a base, a carriage supported on the base with provision for linear movement, a work holder rotatably mounted on said carriage with its axis transverse to the path of the carriage adapted to carry a work piece, a master cam secured to the work holder, a cutting tool disposed in position to be engaged by such work piece and for approach and recession of the axis of the work piece toward and away from its active cutting portion, mechanism for rotating the work holder and thereby rotating the work piece and master cam, a lever pivoted to the work piece at a point distant from the master cam and having an arm extending transversely of the carriage path across the plane in which the cam rotates, a cam follower bearing on the surface of the cam, a thrust member interposed between the cam follower and lever in contact with the lever at a fixed distance from the pivot thereof, coupling holders mounted on the lever and carriage, respectively, and a coupling held by said coupling holders, the effective length of the coupling being equal to that of the said thrust member, the coupling and coupling holders being adjustable toward and away from the axis of the lever in the space between the pivoted end thereof and the point of engagement thereof with the thrust member; the pivot axis of the lever, the effective end point of the coupling and the point of engagement of the thrust member with the lever being all in the same straight line transverse to the path of the carriage.

6. A machine for the purpose set forth, comprising a base, a carriage movable linearly back and forth on said base, a work spindle rotatably mounted on the carriage with its axis transverse to the path of the carriage adapted to carry a work piece, a rotatable cutting tool having an active cutting portion in a plane perpendicular to its axis of rotation disposed transversely of the path of the carriage and in position to engage the periphery of a work piece while the carriage travels back and forth, a master cam secured to the work spindle, means for rotating the work spindle with the master cam and work piece, a cam follower having a straight abutting surface in contact with the periphery of said cam, means for supporting the cam follower and permitting displacement thereof while causing all positions of the abutting face to be parallel with each other comprising parallel resilient bars projecting from the base and a holder for the follower forming a parallelogram with said bars and the base, and a proportional motion linkage arranged to receive motion from said follower and transmit motion of displacement to the carriage.

7. A machine for the purpose set forth, comprising a base, a carriage movable linearly back and forth on said base, a work spindle rotatably mounted on the carriage with its axis transverse to the path of the carriage adapted to carry a work piece, a rotatable cutting tool having an active cutting portion in a plane perpendicular to its axis of rotation disposed transversely of the path of the carriage and in position to engage the periphery of a work piece while the carriage travels back and forth, a master cam secured to the work spindle, means for rotating the work spindle with the master cam and work piece, a cam follower having a straight abutting surface in contact with the periphery of said cam, means for supporting the cam follower and permitting displacement thereof while causing all positions of the abutting face to be parallel with each other comprising parallel resilient bars projecting from the base and a holder for the follower forming a parallelogram with said bars and the base, a lever pivotally supported by the base having an arm extending transversely of the path of movement of the carriage to a position beside the cam follower, a thrust member extending from the cam follower to engagement with the lever, and a coupling connected to the lever and carriage between points in a line substantially parallel to the carriage path disposed at a shorter distance from the pivot axis than the distance of the engaging point of said thrust member from said axis, the connections of the coupling with the carriage and lever being adjustable to vary the distance of the coupling from the lever axis.

8. A cam cutting machine comprising a supporting structure, a carriage mounted on said supporting structure with provision for linear movement in opposite directions, a work holder supported rotatably on said carriage with its axis of rotation transverse to the path of the carriage, a master cam in connection with said holder for movement simultaneously therewith, a cutting tool operatively mounted in a relation to the carriage such that the carriage, moving in its prescribed path, displaces a work piece secured to the holder toward or away from said tool, and a pantograph linkage pivoted at a fixed point on the supporting structure arranged to be moved about its pivot by said master cam and including an adjustable connection with the carriage.

9. A cam cutting machine comprising a supporting structure, a carriage mounted on said supporting structure with provision for linear movement in opposite directions, a work holder supported rotatably on said carriage with its axis of rotation transverse to the path of the carriage, a master cam in connection with said holder for movement simultaneously therewith, a cutting tool operatively mounted in a relation to the carriage such that the carriage, moving in its prescribed path, displaces a work piece secured to the holder toward or away from said tool, a lever pivoted on the supporting structure having a long arm operatively related to the said master cam to be shifted in consequence of such movement of the cam and a shorter arm of variable effective length in motion transmitting connection with the carriage.

WENDELL P. NORTON, Jr.

No references cited.